(12) United States Patent
Zhang

(10) Patent No.: US 7,478,120 B1
(45) Date of Patent: Jan. 13, 2009

(54) SYSTEM AND METHOD FOR PROVIDING A PEER INDEXING SERVICE

(76) Inventor: Xiaohai Zhang, 7924 NE. 182nd Pl., Kenmore, WA (US) 98028

( * ) Notice: Subject to any disclaimer, the term of this patent is extended or adjusted under 35 U.S.C. 154(b) by 1148 days.

(21) Appl. No.: 10/832,657

(22) Filed: Apr. 27, 2004

(51) Int. Cl.
*G06F 15/16* (2006.01)
(52) U.S. Cl. .................... 709/201; 707/100; 707/10; 709/251
(58) Field of Classification Search ............ None
See application file for complete search history.

(56) References Cited

U.S. PATENT DOCUMENTS

| | | | |
|---|---|---|---|
| 6,092,201 A * | 7/2000 | Turnbull et al. ............ 726/4 |
| 6,266,420 B1 * | 7/2001 | Langford et al. ............ 380/282 |
| 6,748,530 B1 * | 6/2004 | Aoki ........................ 713/156 |
| 7,139,760 B2 * | 11/2006 | Manion et al. ............. 707/10 |
| 7,231,463 B2 * | 6/2007 | Nagendra et al. ........... 709/251 |
| 7,263,560 B2 * | 8/2007 | Abdelaziz et al. .......... 709/238 |
| 7,308,496 B2 * | 12/2007 | Yeager et al. .............. 709/224 |
| 7,401,152 B2 * | 7/2008 | Traversat et al. ........... 709/230 |
| 7,401,153 B2 * | 7/2008 | Traversat et al. ........... 709/230 |
| 2002/0143989 A1 * | 10/2002 | Huitema et al. ............. 709/243 |
| 2002/0194484 A1 * | 12/2002 | Bolosky et al. ............. 713/189 |
| 2003/0055892 A1 * | 3/2003 | Huitema et al. ............. 709/204 |
| 2003/0056093 A1 | 3/2003 | Huitema et al. |
| 2003/0182421 A1 * | 9/2003 | Faybishenko et al. ....... 709/224 |
| 2003/0204742 A1 | 10/2003 | Gupta et al. |
| 2004/0064693 A1 * | 4/2004 | Pabla et al. ................. 713/168 |
| 2005/0007964 A1 * | 1/2005 | Falco et al. ................ 370/256 |
| 2005/0063318 A1 * | 3/2005 | Xu et al. .................... 370/254 |
| 2005/0108203 A1 * | 5/2005 | Tang et al. .................. 707/3 |
| 2006/0085385 A1 * | 4/2006 | Foster et al. ................ 707/1 |
| 2007/0112803 A1 * | 5/2007 | Pettovello .................. 707/100 |
| 2007/0174309 A1 * | 7/2007 | Pettovello .................. 707/100 |

OTHER PUBLICATIONS

Suman Banerjee, Efficient Peer location on the internet, May 15, 2004, ScienceDirect, pp. 5-17.*
Maia-DelPilar Villamil, PinS: Peer to Peer Interrogation and Indexing System, Aug. 9, 2004, pp. 1-10.*
Nicole Hatt, Peer-to-Peer Systems, Dec. 2003, pp. 1-2.*
Li-wei Lehman, PALM: Predicting Internet Network Distances Using Peer-to-Peer Measurments, Jan. 2004, pp. 1-12.*
Antony Rowstron, Pastry: Scalable, decentralized object location and routing for large-scale peer-to-peer systems, 2001, pp. 1-22.*

(Continued)

*Primary Examiner*—Luke S. Wassum
*Assistant Examiner*—Sherief Badawi

(57) ABSTRACT

A peer graph is formed by assigning published identifiers to peer nodes that each map to network addresses. A signed number space is defined based on the published identifiers. Given a key, a closest peer node is determined by maintaining data identifying other peer nodes. Index information identifying the key and an associated value are stored as a pair on a storing peer node. Further key and value pairs are maintained in a local indexing database. Hierarchically structured levels are organized in a peer indexing database as a factor of the number space size. A group identifier is stored at a peer indexing database level determined as a function of the storing peer node, level and number space size factor. The key is hashed as a function of the initial group identifier and number space size factor to identify a closest peer node. Key and value pairs are transiently maintained.

42 Claims, 11 Drawing Sheets

OTHER PUBLICATIONS

Chi Zhang, SkipIndex: Towards a Scalable Peer-to-Peer Index Service for High Dimensional Data, 2004, pp. 1-16.*

Stoica et al., "Chord: A Scalable Peer-to-Peer Lookup Service for Internet Applications," Aug. 2001, *SIGCOMM '01*.

Rivest et al., "PayWord and MicroMint: Two Simple Micropayment Schemes," CryptoBytes, Spring 1996, pp. 7-11, vol. 2, No. 1, RSA Labs.

* cited by examiner

SYSTEM AND METHOD FOR PROVIDING A PEER INDEXING SERVICE

FIELD OF THE INVENTION

The present invention relates in general to peer-to-peer networking and, in particular, to a system and method for providing a peer indexing service.

BACKGROUND OF THE INVENTION

Computer networking continues to evolve. The earliest computer networks connected dumb terminals to monolithic centralized computers. Each terminal was limited to displaying only those services provided by the centralized computer. Later, personal computers revolutionized computing by enabling individual users to execute applications independently. Local area networks formed from interconnected personal computers facilitated intercomputer communication and resource sharing. Wide area networks combining diverse computing platforms, including personal computers through legacy mainframes, have enabled access to information and computing services worldwide through interconnectivity to internetworks, such as the Internet.

Conventional local area and wide area network services typically include a centralized server to manage and coordinate network service activities for subscribing peer nodes. The use of such centralized servers results in the creation of two de facto "classes" of computer systems, whereby computational services are provided by one or more powerful server nodes, while various capable, but underutilized, client nodes are relegated to consuming information and services. Recent advances in peer-to-peer networking design attempt to rebalance these computational inequities by better utilizing the idle computational, storage and bandwidth resources found in the client nodes. When coupled with the services provided by conventional server nodes, peer-to-peer networking seeks to provide a higher level of network services at a lower overall cost.

Certain types of network services that are generally provided in a server-centric fashion, however, must be redefined when moving from the conventional client-server network model to a peer-to-peer network model. For example, information discovery and retrieval that is provided through on-line searching tools, such as those services provided by MSN and Google, have become increasingly popular among Internet users. These tools rely on a centrally located and managed indexing database and information requests are resolved by performing a query against the indexing database. Building and efficiently accessing the indexing database remains an essential aspect of these tools, although recent efforts at distributing indexing databases amongst peer nodes have suffered in terms of scalability, success rate and real-time performance.

Providing remote access to distributed indexing information in both conventional IP subdomains and within peer-to-peer networks poses challenges with respect to availability and scalability. First, peer nodes frequently include local file storage and locally stored information that can be made available to other nodes over the network through various types of network file systems and file sharing arrangements. However, access to such information requires that the storing node be available. Most file access schemes fail when the storing node is unavailable either due to being off-line or inactive.

In a peer-to-peer system, the key can be used to select a node to store the key and value pair. Preferably, the key maps to the node in a deterministic fashion and any node in possession of the key is able to readily find the node storing the value. Popular or frequently recurring keys tend to create a logical "hotspot" within a network that overtaxes the node associated with the key. The node receives a disproportionate amount of query traffic and must provide extra processing and network bandwidth and additional storage capacity. Hotspots can be minimized through the use of non-deterministic key assignments, but ensuring consistent usage at every node in possession of a potential key in a distributed computing environment can be difficult or impracticable to manage.

There is a need for an approach to provide deterministic storage of indexing information for key and value pairs in a distributed peer-to-peer network. Preferably, such an approach would be scalable to support indexing through a wide area network scale, including on the Internet. To support such high scalability, such an approach would properly distribute information to avoid any hotspots and offer close-to-real-time performance. Preferably, such an approach would ensure the accessibility of indexing information at all levels through a combination of neighboring peer nodes and duplication.

SUMMARY OF THE INVENTION

An embodiment provides a system and method for providing a peer indexing service. A peer graph is formed by assigning published identifiers to each of one or more peer nodes that each map to network addresses. A signed number space is defined over the peer graph based on the published identifiers. Given a key, a closest peer node is determined by maintaining data identifying other peer nodes in the peer graph. Index information identifying the key and an associated value stored as a pair on a storing peer node in the peer graph is maintained. Further key and value pairs is maintained in a local indexing database. A plurality of hierarchically structured levels is organized in a peer indexing database as a factor of the number space size. A level group identifier is stored at a level of the peer indexing database determined as a function of the published identifier of the storing peer node, the level and the number space size factor. The key is hashed as a function of the initial level group identifier and the number space size factor to identify a closest peer node sharing the initial level group identifier. Key and value pairs are transiently maintained in a peer index cache.

Still other embodiments of the present invention will become readily apparent to those skilled in the art from the following detailed description, wherein are one embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

Detailed Description

Glossary

| | |
|---|---|
| Peer User: | A client within a network domain that includes a binding of a private and public key, or other type of uniquely assignable crypto key. The binding is known as a peer identifier, and is unique to each peer user. In the described embodiment, each peer identifier is a 128-bit cryptographic hash of the public key generated using, by way of example, MD5, SH1 or other cryptographic hashing algorithms. |
| Peer-to-Peer System: | The set of all peer users. Also known as a peer system. |
| Peer Graph: | One or more peer nodes forming a logical subset of peer users within a given peer system. A peer graph can have a membership structure different than the peer system. Each peer user can participate in one or more peer graphs. Similarly, several peer graphs can be defined within a given peer system. |
| Peer Node: | One running instance of a peer user defined within a peer graph. Each peer node is assigned a published identifier that combines a peer identifier and an instance identifier. In the described embodiment, each instance identifier is a 128-bit randomly assigned number. |
| System Certificate: | A certificate providing a signed statement authenticating a peer system and binding a private and public key to the peer system. |
| Logon Certificate: | A certificate issued by a peer system management server node on behalf of a peer system that vouches for the authenticity of a peer user and represents membership in the peer system. |
| Address Certificate: | A certificate defining a mapping between a published identifier and a physical network address. |

The foregoing terms are used throughout this document and, unless indicated otherwise, are assigned the meanings presented above.

Peer Indexing Service System Overview

Figure 1:
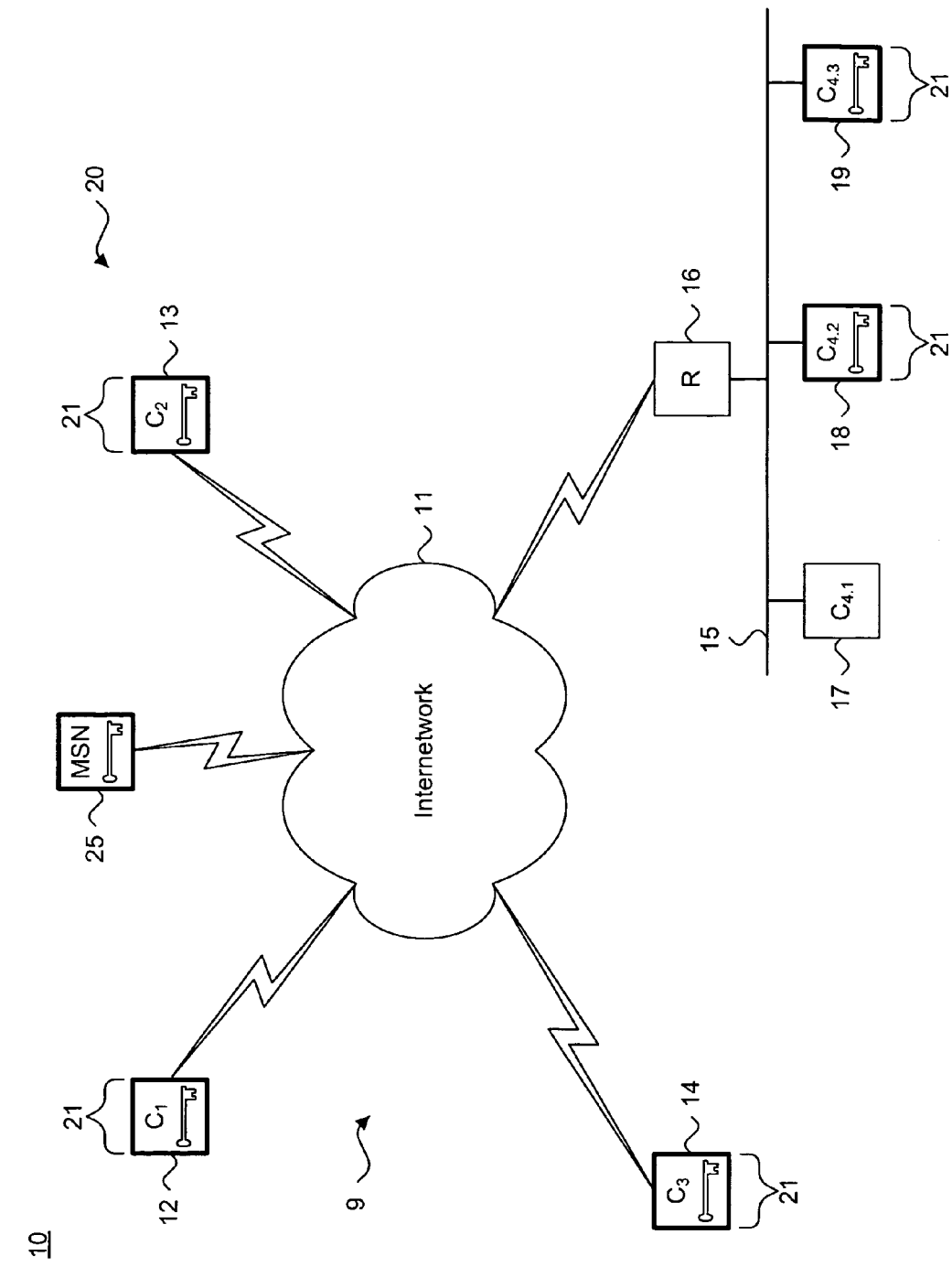
FIG. 1 is a block diagram showing a system for providing a peer indexing service, in accordance with the present invention.

FIG. 1 is a block diagram showing a system 10 for providing a peer indexing service, in accordance with the present invention. The peer indexing service supports resource discovery and publishing between individual peer nodes appearing in a peer graph logically defined within a peer system 20 within a network domain 9, as further described below beginning with FIG. 2. The peer indexing service is implemented by each peer node as part of a suite of peer-to-peer network services, which can include a peer name service, peer cyber money service, and peer storage service, such as further described in commonly-assigned U.S. patent application Ser. No. 10/832,730, entitled "System And Method for Providing a Peer Name Service," filed Apr. 27, 2004, pending; Ser. No. 10/832,604, entitled "System And Method for Providing a Peer Cyber Money Service," filed Apr. 27, 2004, pending; and Ser. No. 10/832,662, entitled "System And Method for Providing a Peer Storage Service," filed Apr. 27, 2004, pending, respectively, the disclosures of which are incorporated by reference. The peer-to-peer network services are application protocol layer constructs, which rely on the underlying transport, network and link protocol layers to provide standardized lower-level network services, such as message exchange and physical connectivity.

By way of example, the network domain 9 can include a plurality of individual clients 12, 13, 14 interconnected to an internetwork 11, such as the Internet, and a further plurality of individual clients 17, 18, 19 interconnected to an intranetwork 15, which is in turn connected to the internetwork 11 via a router 16 or similar gateway or network interfacing device. In the described embodiment, the clients interconnected to both the internetwork 11 and intranetwork 15 operate in accordance with the Transmission Control Protocol/Internet Protocol (TCP/IP), such as described in W. R. Stevens, "TCP/IP Illustrated," Vol. 1, Chs. 1-3, Addison Wesley Longman, Inc., Reading, Mass., (1994), the disclosure of which is incorporated by reference. Other network domain topologies, organizations and arrangements are possible.

One or more of the clients from the network domain 9, such as clients 12, 13, 14, 18, 19, can be logically grouped to form a single security domain, referred to as a peer system 20. The peer system 20 includes one or more peer users 21, which correspond to the clients 12, 13, 14, 18, 19. Each peer system 20 includes a binding of a private and public key pair. A client lacking a private and public key pair is ineligible to participate as a peer user 21. The peer system 20 also includes a binding of a private and public key pair. The private and public key pair bindings of the peer system 20 and each peer user 21 are respectively evidenced by an authenticated system certificate and address certificate. In addition, each peer user 21 is issued a logon certificate to enable entry into the peer system 20. System certificates, address certificates, and logon certificates are further described below with reference to FIG. 9.

Each peer system 20 also includes at least one peer system management server node (MSN) 25, which is a well-known node that provides necessary centralized servicing to the peer users 21. Each management server node 25 provides membership management, name service bootstrapping, micropayment virtual banking, and gateway services. Other types of services are possible and different services can be provided by different system management server nodes 25.

The individual clients are general purpose, programmed digital computing devices consisting of a central processing unit (CPU), random access memory (RAM), non-volatile secondary storage, such as a hard drive or CD ROM drive, network interfaces, and can include peripheral devices, such as user interfacing means, such as a keyboard and display.

Program code, including software programs, and data are loaded into the RAM for execution and processing by the CPU and results are generated for display, output, transmittal, or storage.

Peer Graph

Figure 2:
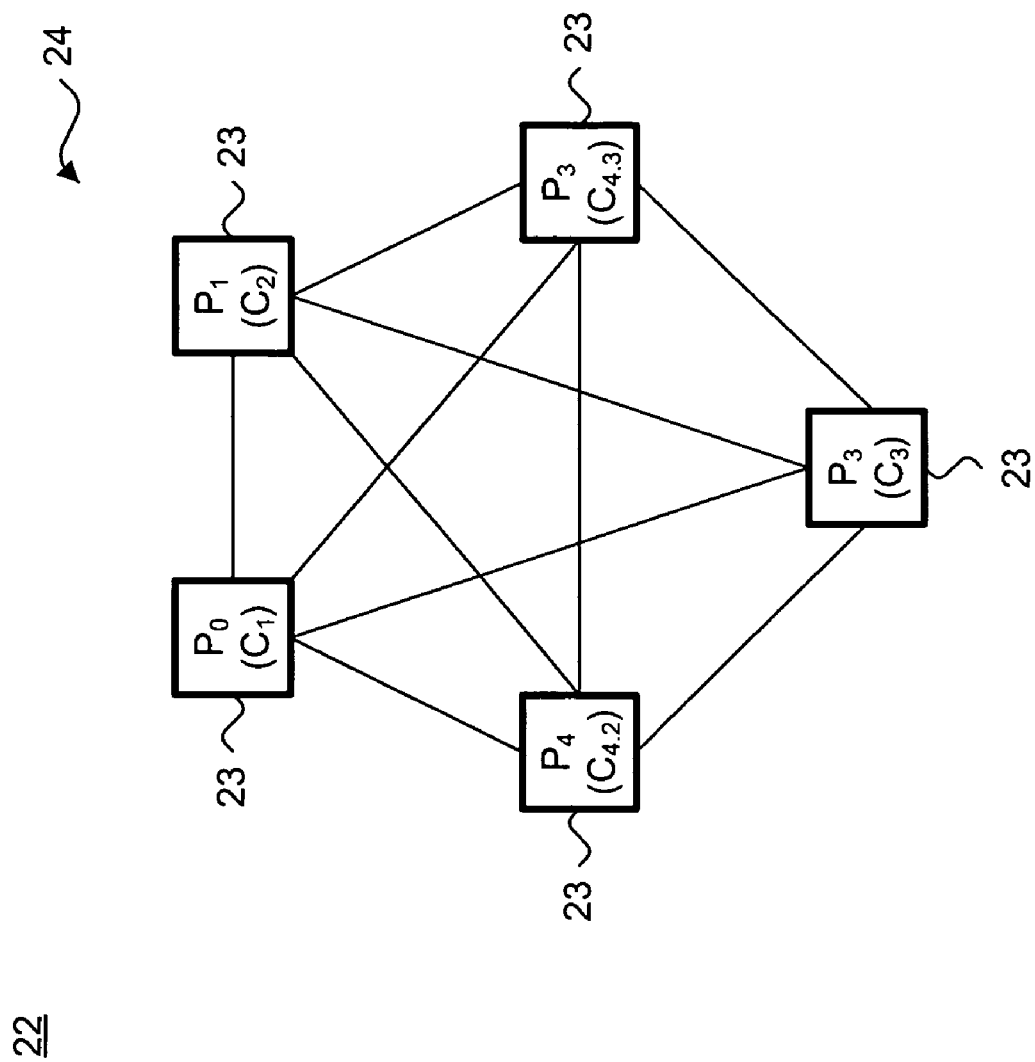
FIG. 2 is a block diagram showing a peer graph logically defined within the peer system of FIG. 1.

FIG. 2 is a block diagram 22 showing a peer graph 24 logically defined within the peer system 20 of FIG. 1. One or more of the peer users 21 can be grouped as peer nodes 23 to form a peer graph 24 within a peer system 20. In addition, a single peer user 21 can appear one or more times as a peer node 23 participating one or more times in the same or other peer graphs 24. Each peer graph appearance is uniquely identified using an instance identifier. Each peer user 21 includes a binding of a private and public key pair, which is used to form a peer identifier. The peer identifier and instance identifier form a published identifier for each peer node 23.

Figure 3:
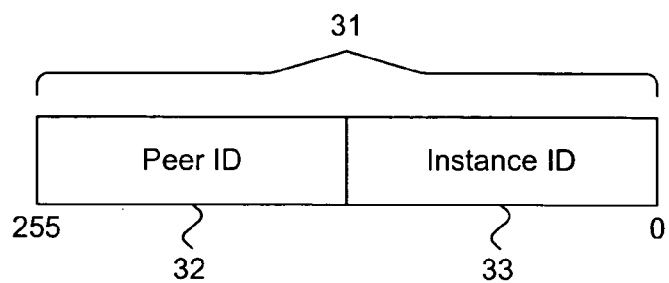
FIG. 3 is a data structure diagram showing a published identifier for use by a peer node in the peer graph of FIG. 2.

FIG. 3 is a data structure diagram 30 showing a published identifier 31 for use by a peer node 23 in the peer graph 24 of FIG. 2. The published identifier 31 identifies a specific instance of a peer user 21 within the peer graph 24 by combining a peer identifier 32 with an instance identifier 33. Published identifiers are used within the peer graph 24 to identify particular appearances of peer users 21 within a peer system 20. Thus, by using a published identifier 31, any given peer user 21 can simultaneously participate in multiple peer graphs 24 and, within any given peer graph 20, can appear multiple times. Each such appearance is presented as a peer node 23.

Each peer node 23 corresponds physically to a client in the underlying network domain 9. The client identify of a peer node 23 is resolved through a peer name service, which is implemented in a fully distributed fashion by each peer node 23 in the peer graph 24, such as further described in commonly-assigned U.S. patent application Ser. No. 10/832,730, entitled "System And Method for Providing a Peer Name Service," filed Apr. 27, 2004, pending, the disclosure of which is incorporated by reference. A client identify is required for each peer node 23 to access the underlying transport, network and link protocol layer network services. In the described embodiment, client identities are represented by physical internet protocol (IP) network addresses, such as defined by IP versions 4 and 6, although other forms of physical network addresses could also be used. The mapping of published identifier 31 and physical network address is provided by an address certificate uniquely associated with the peer node 23, as further described below with reference to FIG. 9.

Peer identifiers 32 identify specific peer users 21. Instance identifiers 33 identify specific appearances of peer user 21 within a peer graph 24. The peer identifier 32 is a hash of the public key of the peer user 21. The instance identifier 33 is randomly assigned. Instance identifiers 33 enable a peer user 21 to appear multiple times in the same peer graph 24 with each appearance being uniquely identified by a different instance identifier 33. In the described embodiment, each instance identifier 33 is a 128-bit randomly generated number, although other sizes of appearance instance identifiers are possible. The published identifier 31 forms a 256-bit signed integer including the 128-bit peer identifier 32 and 128-bit instance identifier 33, which thereby defines the number space within which the peer graph 24 operates.

Referring back to FIG. 2, a peer graph 27 is similar to a subdomain in a conventional TCP/IP-based internetwork; however, peer graphs 27 are implemented over a number space and are structured as true distributed networks. No single peer node 23 is assumed to possess a complete view of the entire peer graph 24. Rather, each peer node 23 maintains knowledge of the nearest neighboring peer nodes. A target peer node 23 is identified by sending name resolution queries through a peer name service implemented by each peer node 23, as further described below beginning with FIG. 9. Each queried peer node 23 returns a list of closest peer nodes 23. The peer node list can be used by the requesting peer node 23 to determine the physical network address of the underlying client corresponding to the target peer node 23.

Peer Graph Number Space

Figure 4:
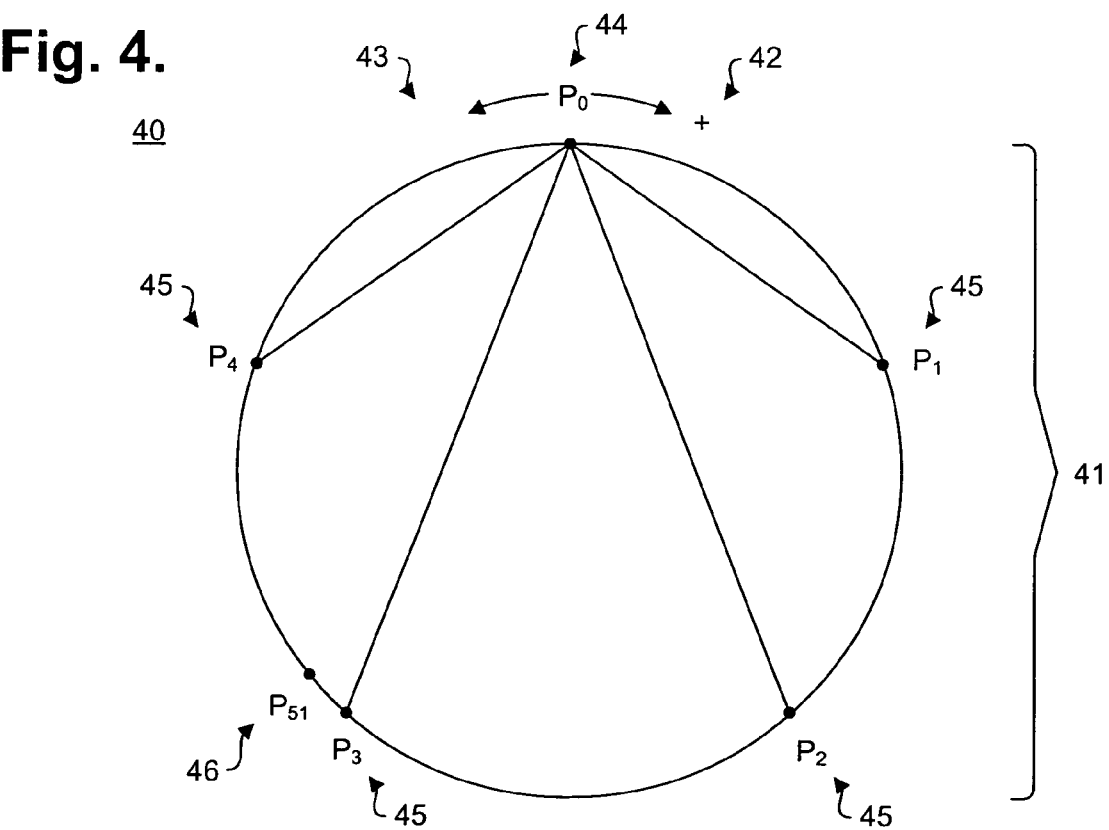
FIG. 4 is a block diagram showing, by way of example, a number space representing the peer graph of FIG. 2.

FIG. 4 is a block diagram 40 showing, by way of example, a number space 41 representing the peer graph 24 of FIG. 2. Each peer graph 24 is defined by the set of published identifiers 31 assigned to the peer nodes 23 participating in the peer graph 24. As a result, the universe of the published identifier set is a number space 41 that maps all possible values of the published identifiers 31 of the peer graph 24. The size of the number space T equals $\log_M S$, where M is a base and S is an operand equal to the magnitude of the number space 41. In the described embodiment, the number space 41 equals 2256 and the number space size T=256. Other published identifiers 31 and, therefore, sizes of number spaces 41 are possible.

To improve performance, the published identifiers 31 are mapped into a logically circular number space to halve the magnitude T of the number space. In the described embodiment, the maximum distance is reduced to $2^{255}$. Published identifiers 31 are treated as signed integers, which dictate the operations defined over the number space 41. Addition and subtraction operations are defined according to the rules applicable to signed integers. The maximum distance between any pair of peer nodes 23 is equal to the magnitude T of the number space.

For each published identifier N, the sign, absolute value, relational, and distance operators are redefined to operate within the circular number space. The sign of N is defined as follows:

$$\text{Sign}(N) = \begin{cases} +1 & \text{If } MSB(N) = 0 \text{ and } N \neq 0 \\ 0 & \text{If } N = 0 \\ -1 & \text{If } MSB(N) \neq 0 \text{ and } N \neq 0 \end{cases}$$

where MSB(N) is the most significant bit of the published identifier N. The absolute value of N is defined as follows:

$$\text{Abs}(N) \begin{cases} N & \text{If } \text{Sign}(N) = +1 \\ 0 & \text{If } N = 0 \\ !(N-1) & \text{If } \text{Sign}(N) = -1 \end{cases}$$

The relational operators between two published identifiers $N_1$ and $N_2$ differ from conventional relational operators for signed integers and are defined as follows:

$N_1 > N_2$ If $\text{Sign}(N_2 - N_1) = -1$ $N_1 = N_2$ If $\text{Sign}(N_2 - N_1) = 0$ $N_1 < N_2$ If $\text{Sign}(N_2 - N_1) = +1$ Finally, the distance between two published identifiers $N_1$ and $N_2$ is defined as follows:

$\text{Dist}(N_1, N_2) = \text{Abs}(N_2 - N_1)$ where:

If $Dist(N_1, N_3) < Dist(N_2, N_3)$, then $N_1$ is closer to $N_3$ than $N_2$.

If $N_1 > N_2$, then $N_1$ is at the positive side of $N_2$, or $N_1$ is to the light of $N_2$.

If $N_1 < N_2$, then $N_1$ is at the negative side of $N_2$, or $N_1$ is to the left of $N_2$.

By way of example, relative to peer node $P_0$, peer nodes $P_1$ and $P_2$ are on the positive or right side 42 of peer node $P_0$ and peer nodes $P_4$, $P_{51}$ and $P_3$ are on the negative or left side 43 of peer node $P_0$.

Peer Node Tree

Figure 5:
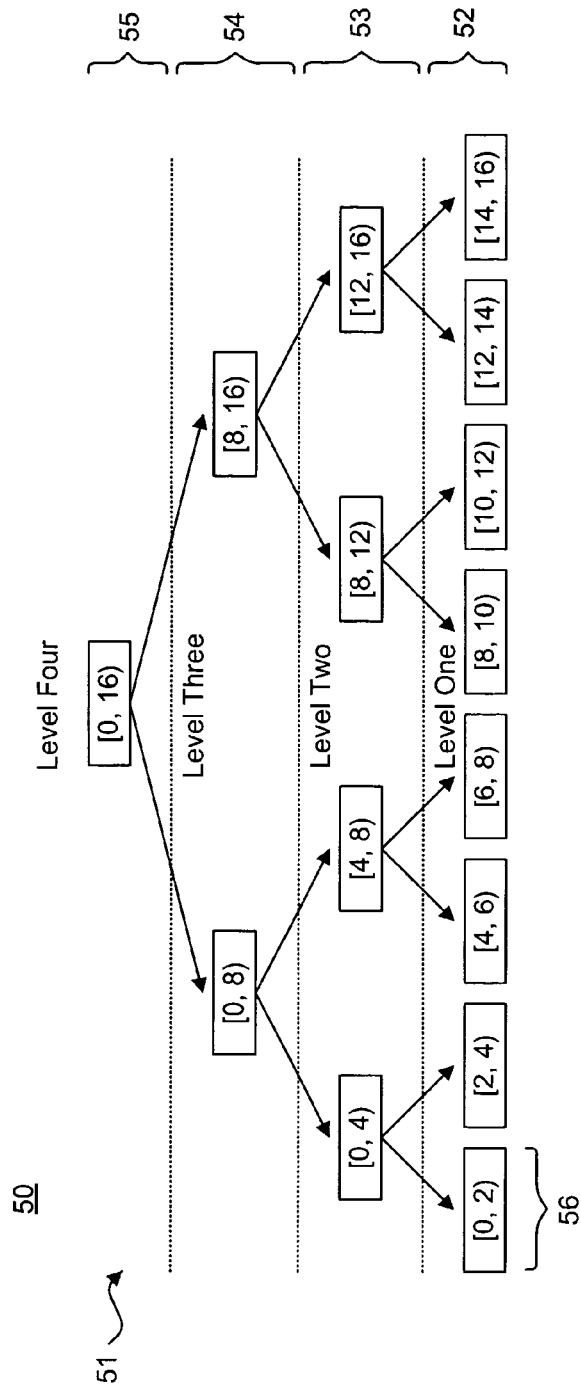
FIG. 5 is a graph diagram showing, by way of example, a peer node tree logically formed within the peer graph of FIG. 2.

FIG. 5 is a graph diagram 50 showing, by way of example, a peer node tree 51 logically formed within the peer graph 24 of FIG. 2. Each peer node tree 51 is defined as a set of hierarchically structured levels 52-55, which each contain one or more groups 56. Each group 56 specifies a numeric range to which each published identifier 31 is assigned. Key and value pairs can be stored at any peer node 23. Within the lowest initial level 52, indexing information that enables other peer nodes 23 to discover the stored key and value pairs is published to a closest peer node 23, referred to as an initial level group indexing peer node, within the same group 56, as the storing peer node 23, as further described below with reference to FIG. 11. The indexing information is subsequently published to a peer node 23, also known as a subsequent level group indexing peer node, within each next higher level 53-54 up through the highest level 55, as further described below with reference to FIG. 13. The indexing information can then be used to locate the stored key and value pairs during query sessions, as further described below with reference to FIG. 14. For convenience, the initial level 52 is referred to as level one and each subsequent level is referred to as level two, level three and so forth and an indexing peer node located at an arbitrary level J is called level J group indexing peer node.

Figure 6:
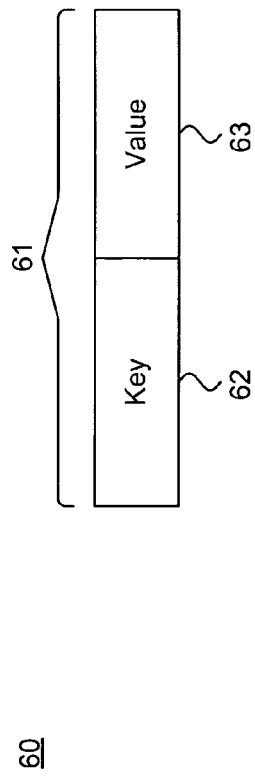
FIG. 6 is a data structure diagram showing a local index entry for use by each peer node in logically implementing the peer node tree of FIG. 5.

FIG. 6 is a data structure diagram 60 showing a local index entry 61 for use by each peer node 23 in logically implementing the peer node tree 51 of FIG. 5. Each local index entry 61 identifies a discoverable resource by combining a key 62 with a value 63. The local index entry 61 is maintained at the peer node 23 storing the key and value pair. The key 62 identifies the value 63 and can be either derived directly from the value 63, such as by using selected keywords or a hashing function, or be arbitrarily assigned. The value 63 can be any type of data or information, which can be accessed by other peer nodes 23 in the peer graph 24 by use of the key 62. As an example, the value 63 can be a Uniform Resource Locator (URL) referring to a particular shared document.

Figure 7:
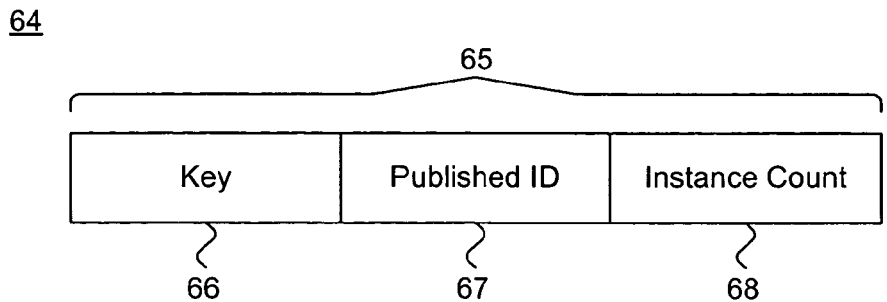
FIG. 7 is a data structure diagram showing a peer index entry for use by each peer node in logically implementing an initial level of the peer node tree of FIG. 5.
Figure 8:
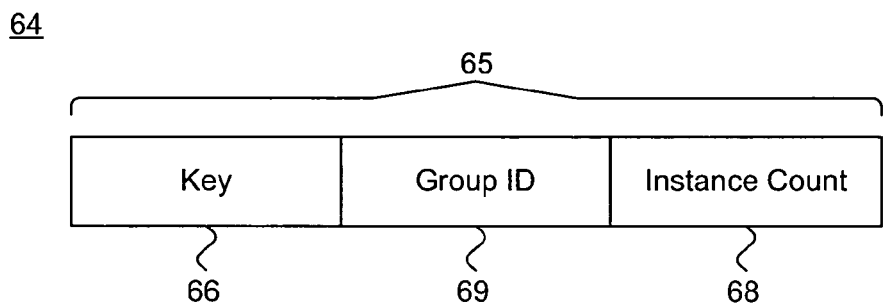
FIG. 8 is a data structure diagram showing a peer index entry for use by each peer node in logically implementing a subsequent level of the peer node tree of FIG. 5.

The key 62 is also used to publish indexing information identifying the storing peer node 23 to one or more other peer nodes 23 in the peer node tree 51. FIGS. 7 and 8 are data structure diagrams 64 showing a peer index entry 65 for use by each peer node in logically implementing an initial level 52 and a subsequent level 53-55, respectively, of the peer node tree 51 of FIG. 5. The peer index entry 66 identifies the indexing information by combining a copy of the key 67, a published identifier 67 or group identifier 69, and an instance count 69. In the initial level 52, each peer node 23 maintains an array of peer index entries 65, which each identify another peer node 23 also in the initial level 52, using the published identifier 67, that is storing a value 63 identified by the key 66. In subsequent levels 53-55, each peer node 23 maintains an array of peer index entries 65, which each identify another peer node 23 also in the same subsequent level 53-55, using the lower level group identifier 69, that is storing indexing information for a value 63 identified by the key 66. In addition, each peer index entry 65 includes an instance count 68 specifying a number of instances of the stored value 63, which is used in unpublishing indexing information, as further described below with reference to FIGS. 12 and 13.

Referring back to FIG. 5, the size of each group 56 is selected as a factor F of the number space size T. In the described embodiment, the factor F is a multiplicand evenly divisible into the number space size T, although other factors are possible. By way of example, the peer node tree 51, as shown in FIG. 5, assumes a number space size T=4 with a factor F=1.

Each peer node 23 is assigned to a group 56 within each level 52-55. Group assignments are based on the published identifier 31 of the peer node 23 the factor F. The group identifier $G_J(P)$ for a given peer node P at one such level number J is determined in accordance with equation (1), as follows:

$$G_J(P) = \left\lfloor \frac{P}{2^{J \times F}} \right\rfloor \qquad (1)$$

for J=0, 1, ..., T/F, where T/F represents an upper bound on the number of levels. Similarly, the group $R_J(P)$ for a given peer node P at one such level number J is determined in accordance with equation (2), as follows:

$$R_J(P) = \left[ \left\lfloor \frac{P}{2^{J \times F}} \right\rfloor \times 2^{J \times T}, \left( \left\lfloor \frac{P}{2^{J \times F}} \right\rfloor + 1 \right) \times 2^{J \times F} \right) \qquad (2)$$

for J=0, 1, ..., T/F.

The closest peer node 23 to which indexing information is published within a group 56 is selected by first applying a hashing function to the key 66 based on the published identifier 31 of the storing peer node 23 to determine an interim peer node $P_J'$. The hashing function $H_J(P,K)$ for a given key K stored at a peer node P at one such level number J is determined in accordance with equation (3), as follows:

$$H_J(P, K) = (\text{Hash}(K) \% 2^{J \times F}) + \left\lfloor \frac{P}{2^{J \times F}} \right\rfloor \times 2^{J \times F} \qquad (3)$$

for J=0, 1, ..., T/F.

and where the hashing function Hash( ) maps the published identifier 31 into the number space 41.

Next, the closest peer node $P_J$, also known as level J group indexing peer node, is identified by applying a function to the result of the hashing function $H_J(P, K)$ to return the closest neighboring peer node $P_J$ determined in accordance with equation (4), as follows:

$$P_J = C_J(H_J(P,K)) = C_J(H_J(G_J,K)) \qquad (4)$$

where the $G_J$ is the level J group for peer node P determined in accordance with equation (1) and $C_J(P)$ is a function returning a closest neighboring peer node $P_J$ to peer node P. In the described embodiment, the closest neighboring peer node $P_J$ is determined by a peer name service, such as further described in commonly-assigned U.S. patent application Ser. No. 10/832,730, entitled "System And Method for Providing a Peer Name Service," filed Apr. 27, 2004, pending, the disclosure of which is incorporated by reference. Other formulae and methodologies for determining a group identifier, group, and hash value are possible.

Peer Node

Figure 9:
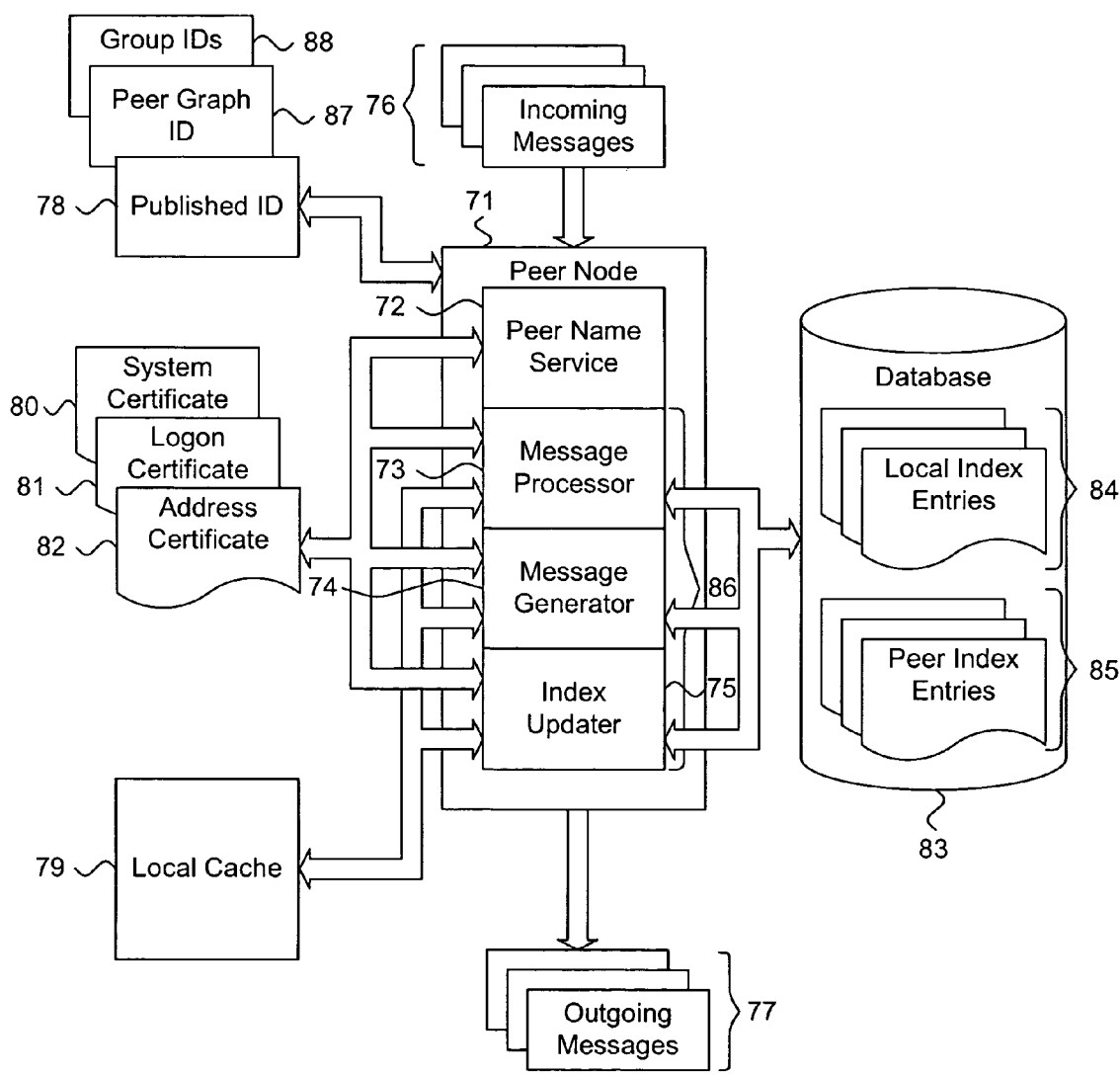
FIG. 9 is a block diagram showing a peer node of the peer graph of FIG. 2.

FIG. 9 is a block diagram 70 showing a peer node 71 of the peer graph 24 of FIG. 2. A peer node 71 is a logical construct within a network domain 9. The peer node 71 is identified within the peer graph 24 by a published identifier 78, which, in the described embodiment, concatenates a 128-bit peer identifier and a 128-bit instance identifier into a unified 256-bit published identifier. The published identifier 78 uniquely identifies a single peer graph appearance of a peer user 21, while an address certificate 82 associated with the peer node 71 maps a published identifier 78 to the physical network address of the underlying client. The peer graph 24 is identified by a peer graph identifier 87. Each peer node 71 implements a peer indexing service 86.

Messages

Peer nodes 71 communicate through message exchange, which enable each peer node 23 to publish and discover resources with other peer nodes 23 in a peer graph 24. In the described embodiment, messages are exchanged using the underlying transport, network and link protocol layers. Incoming messages 76 are processed by the peer node 71 with a message processor 73, while outgoing messages 77 are generated with a message generator 74. The peer indexing service 86 implements five basic message types, PUBLISH, DUPLICATE, QUERY, RESPONSE, and STATUS messages, as further described below. Other types of messages, both for the peer indexing service 86 and for other purposes, are possible.

Generically, each message exchanged by the peer indexing service 86 non-exclusively contains the follow information:
(1) Message Code: An enumerative number identifying a message type. Current message types include PUBLISH, DUPLICATE, QUERY, RESPONSE, and STATUS.
(2) Peer Graph Identifier: An integer value identifying a specific peer graph 24 within a peer system 20. Allows a peer node 71 to participate in multiple peer graphs 24.
(3) Session Identifier: An integer value identifying conversation session. Each conversation session consists of sending a request message, such as a RESOLVE message, and receiving a response message, such as a RESOLVE_RESPONSE message.
(4) Flags: Bitwise values to indicate binary conditions, such as whether a receiving peer node 71 should cache the address certificate 82 of a sending peer node 71.
(5) Latest Address Certificate of Sending Peer Node: Included for optional caching by the receiving peer node 71.
(6) Published Identifier of Receiving Peer Node: Can be left empty, in which case a random peer node at the receiving side is selected.

Other message fields are possible. In addition, other message formats either in addition to or in lieu of those used by the peer indexing service 86 may be specified for the other peer-to-peer network services.

Certificates

The identify of each peer node 71 is guaranteed by a set of certificates, which include a system certificate 80, logon certificate 81, and address certificate 82.

System Certificate

Each system certificate 80 is a self-signed certificate binding of the private and public key pair of a peer system 20. System certificates 80 are used for system identification and as the root of all trust relationships in the peer system 20. Each peer user 21 must have a copy of a system certificate 80 for communication and to establish trust with other peer users 21.

System certificates 80 contain the follow information:
(1) System Certificate Number: A hash of the public key of peer system 20. In the described embodiment, the system certificate number is a 128-bit value.
(2) Peer System Public Key.
(3) Domain Name: Specifies domain name of the peer system 20.
(4) Communication Protocol: Specifies communication protocols supported in the peer system 20. In the described embodiment, TCP/IP-based communication protocols are supported, such as TCP, UDP, HTTP, and so forth.
(5) Peer System Website URL: Provides general system information (for browsing purposes only).
(6) Blob: Provides auxiliary peer system information packed as a binary large object ("blob").
(7) Account Management Server Node URL.
(8) Peer Name Service Bootstrap Server Node URL.
(9) Micropayment Virtual Banking Server Node URL.
(10) Communication gateway Server Node URL.
(11) Flags: A 32-bit flag field identifying URL fields available for the following servers:
  (a) Account management server.
  (b) Peer name service bootstrap server.
  (c) Micropayment virtual banking server.
  (d) Communication gateway server.
(12) Self-signed signature using the private key of the peer system 20.

Other information is possible.

Logon Certificate

Each logon certificate 81 forms the basis for communications between peer users 21. A peer user 21 must first obtain a logon certificate 81 from a management server node 25 before communicating with other peer users 21. All data originating from a peer user 21 is signed by the private key of the peer user 21 and the signature is verified using a copy of the public key of the peer user 21 stored in the logon certificate 81. The logon certificate 81 of a destination peer user 21 is also used for encrypted data communication.

Logon certificates 81 contain the follow information:
(1) Peer System Certificate Number: Uniquely assigned by the management server node 25.
(2) Peer Identifier: A hash of the public key of peer user 21. In the described embodiment, the peer identifier 32 is a 128-bit value.
(3) Version Number: A monotonically increasing integer value.
(4) Peer User Public Key.
(5) Starting Validity Time.
(6) Expiration Time.
(7) Blob: Provides auxiliary peer user information packed as a binary large object ("blob").
(8) Self-signed signature using the private key of the peer user 21.

Other information is possible.

Peer Address Certificate

Each peer address certificate 82, or, simply, address certificate, forms a binding between a peer identifier 32 for a peer user 21 and the physical network address of the underlying client. At runtime, each peer node 23 maintains a cache of address certificates 82 for use by the peer indexing service 86 in performing name resolution. Each peer node 71 maintains only one address certificate 82 at any given time. If the physical network address of a peer node 71 changes, such as, for example, when using dynamic IP addresses, a new version of the address certificate 82 is created.

Address certificates 82 contain the follow information:
(1) Peer Graph Identifier: Uniquely assigned by the management server node 25. In the described embodiment, the peer graph identifier is a 16-bit value.
(2) Peer Identifier: A hash of the public key of peer user 21. In the described embodiment, the peer identifier 32 is a 128-bit value.
(3) Instance Identifier: Identifies a specific appearance of the peer node 23 within a peer graph 24. In the described embodiment, the instance identifier 33 is a 128-bit value.
(4) Address Certificate Version Number: In the described embodiment, the version number is a 32-bit value.
(5) Address Certificate Protocol Version.
(6) Expiration Time.
(7) Peer Node Address URL.
(8) Self-signed signature using the private key of the peer user 21.
(9) Logon Certificate (optional): Provides signature verification.

Other information is possible.

Program Modules

The peer indexing service 86 is implemented at each peer node 71 to provide resource discovery and publishing. To implement the peer indexing service 86, each peer node 71 includes program modules for an optional peer name service 72, message processor 73, message generator 74, and index updater 75.

Peer Name Service

As a peer-to-peer network, each peer node 71 operates within the peer graph 24 presumptively without the complete knowledge of the identities of the other peer nodes 71 that constitute the peer graph 24. Instead, the peer node 71 relies on knowledge of other peer nodes 23 as maintained in a set of caches through an optional peer name service 72, which enables each peer node 71 to learn about closest neighboring peer nodes 71 and resolve the client identify of other peer nodes 71, such as described in commonly-assigned U.S. patent application Ser. No. 10/832,730, entitled "System And Method for Providing a Peer Name Service," filed Apr. 27, 2004, pending, the disclosure of which is incorporated by reference. The peer indexing service 86 uses the client identity provided by the optional peer name service 72 to support resource discovery and publishing. Other types of peer name services could also be used. In a further embodiment, the peer graph 24 is implemented as a conventional subdomain network, such as an IP subdomain, using a centralized name resolution service in lieu of the peer name service 72.

Message Processor and Message Generator

The message processor 73 module processes incoming messages 76. The message generator 74 module processes outgoing messages 77. The message processor 73 and message generator 74 modules are responsible for receiving, processing and sending PUBLISH, DUPLICATE, QUERY, RESPONSE, and STATUS messages, as further described below with reference to FIG. 11 et seq. The types of processing performed by each module depends on whether each specific message type is being received as an incoming message 76 or is being sent as an outgoing message 77.

Briefly, PUBLISH messages are used by a storing peer node to inform a group indexing peer at the initial level about the indexing information maintained by the storing peer node. PUBLISH messages are also used by a group indexing peer in a lower level to notify other group indexing peers at subsequent levels about the indexing information maintained in the lower level. Basically, a key and value pair is first published to all peer nodes in the same initial level group through the initial level group identifier peer node, then to the same next level group through the next level group identifier peer node, and so forth until the key and value pair is published to the T/F level group, which represents the entire peer node 24. PUBLISH messages non-exclusively contain the follow information:
(1) Message header with the message code PUBLISH.
(2) Level of indexing information being sent. Level zero indicates local keys being sent to an initial level group indexing node.
(3) Count of indexing information.
(4) Array of indexing information.

Other information is possible.

DUPLICATE messages are used by a storing peer node to duplicate indexing information to other peer nodes, generally peer nodes neighboring the storing peer node, to improve availability and reliability. DUPLICATE messages non-exclusively contain the follow information:
(1) Message header with the message code DUPLICATE.
(2) Count of indexing information.
(3) Array of indexing information.

Other information is possible.

QUERY messages are used by a peer node to discover indexing information regarding a key from a target peer node at a specified level in the peer node tree 51. Briefly, query processing begins from the root node of the peer node tree 51 and continues by gradually expanding the peer node tree 51. The root of the peer node tree 51 is the group 56 located at level $$L = \frac{T}{F}.$$

To expand a node in the peer node tree 51 at any level, the searching peer node Q sends a QUERY message to a peer node $P_J$ with a published identifier 23 determined in accordance with equation (5), as follows:

$$P_J = C_J(H_J(G_J(Q),K)) \tag{5}$$

where $C_J$ is a function returning the closest neighboring peer node 23 identified using the peer name service 72, $H_J$ is a hashing function determined in accordance with equation (3), $G_J(Q)$ is the level J group for searching peer node Q determined in accordance with equation (1). Upon receiving replies from the above sequences of queries, all intermediate peer nodes cache the indexing information received for a pre-defined amount of time. If the peer node $P_J$ has already cached the indexing information in the local cache 93, peer node $P_J$ sends a RESPONSE message containing the indexing information to the searching peer node Q. Otherwise, if peer node $P_J$ has not cached the indexing information and the level of the target peer node is higher than the level of the query J, peer node $P_J$ forwards the query request to a peer node $P_{J+1}$ with a published identifier 23 determined in accordance with equation (6), as follows:

$$P_{J+1} = C_{J+1}(H_{J+1}(G_{J+1}(Q),K)) \tag{6}$$

where $C_{J+1}$ is a function returning the closest neighboring peer node 23 identified using the peer name service 72, $H_{J+1}$ is a hashing function determined in accordance with equation (3), $G_{J+1}(Q)$ is the level J+1 group for searching peer node Q determined in accordance with equation (1). The process is repeated until the queried peer node either obtains the indexing information for the searching peer node Q or the level of the query matches the level of the target peer node 23. If the query and target peer node 23 levels match, the most recent target peer node 23 forwards the query request to a peer node $P_J^i$ determined in accordance with equation (7), as follows:

$$P_J^i = C_J(H_J(G_J^i, K)) \tag{7}$$

where $C_J$ is a function returning the closest neighboring peer node 23 identified using the peer name service 72, $H_J$ is a hashing function determined in accordance with equation (3), $G_J^i$ is the level J group identifier included in the QUERY message, which identifiers the node in the peer node tree 51 to expand. The peer node $P_J^i$ returns an authoritative answer, which includes a list of the published identifiers 31 for the peer nodes 23 that contain key and value pairs matching the key with a count of the matching key and value pairs for each peer node 23. Individual query requests are then issued directly against the local indexing database of each peer node 23.

QUERY messages non-exclusively contain the follow information:
- (1) Message header with the message code QUERY.
- (2) Query identifier.
- (3) Level of query.
- (4) Level of target peer node.
- (5) Key that is the subject of the query request.
- (6) Group identifier of the group being queried ($G_J^i$).
- (7) Response count.

Other information is possible.

RESPONSE messages are sent by a target peer node in response to a query request. RESPONSE messages non-exclusively contain the follow information:
- (1) Message header with the message code RESPONSE.
- (2) Query identifier.
- (3) Indexing information.

Other information is possible.

Finally, STATUS messages are sent in reply to publishing and duplication requests. Each STATUS message has a status code indicating the operation results. In the described embodiment, status code 200 indicates complete success. Status codes 1XX indicate an operational success with extra processing instruction. Status codes 4XX indicate error codes. STATUS messages non-exclusively contain the follow information:
- (1) Message header with the message code STATUS.
- (2) Status code.
- (3) Binary large object ("blob") that is interpreted based on the status code.

Other information is possible.

Index Updater

The index updater 75 module maintains the local index entries 84 and peer index entries 85 maintained in a database 83 coupled to the peer node 71. Local index entries 84 are maintained for and published by applications and peer index entries 85 are maintained by a group indexing peer at each level, including the initial level. In a further embodiment, the local index entries 84 and peer index entries 85 are lazily updated by deferring the upward publishing of indexing information until a preset threshold is exceeded. Index updating is further described below with reference to FIG. 11 et seq.

In addition, the index updater 75 caches copies of the indexing information contained in the peer index entries 85 into a local cache 79. In the described embodiment, each cache entry includes a time-to-live value and cache entries are discarded upon the expiration of the associated time-to-live values.

Peer Indexing Service Method Overview

Figure 10:
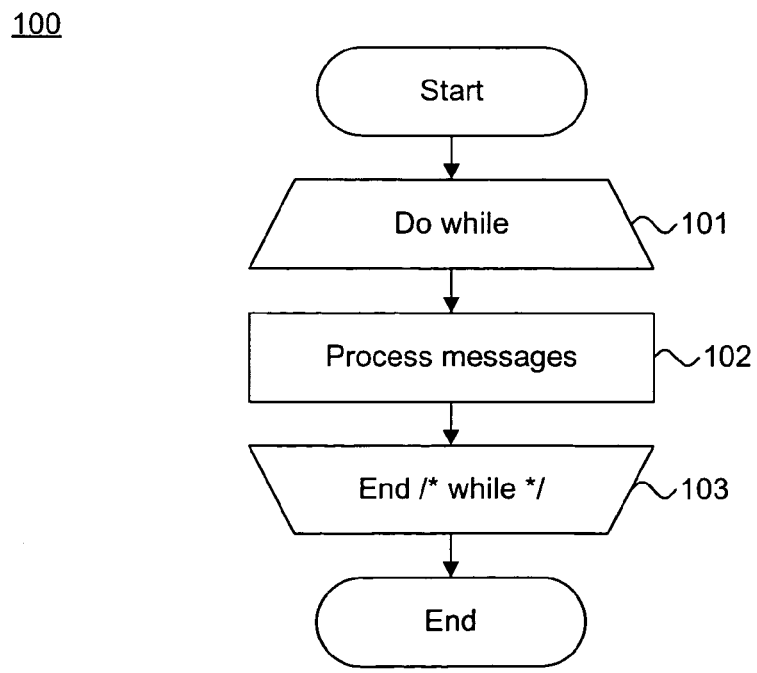
FIG. 10 is a flow diagram showing a method for providing a peer indexing service, in accordance with the present invention.

FIG. 10 is a flow diagram showing a method 100 for providing a peer indexing service 86, in accordance with the present invention. The method 100 is described as a sequence of process operations or steps, which are executed by each peer node 71 participating in a peer node tree 51.

From the standpoint of the peer indexing service 86, the peer node 71 executes a continuous processing loop (blocks 101-103) during which messages are processed (block 102). The peer indexing service 86 implements five basic message types, PUBLISH, DUPLICATE, QUERY, RESPONSE, and STATUS messages, as further described above with reference to FIG. 9 and below, beginning with reference to FIG. 11. Message processing continues indefinitely until the peer node 71 goes offline and becomes inactive (block 103), at which point the method terminates.

Publishing a Local Key/Value Pair

Figure 11:
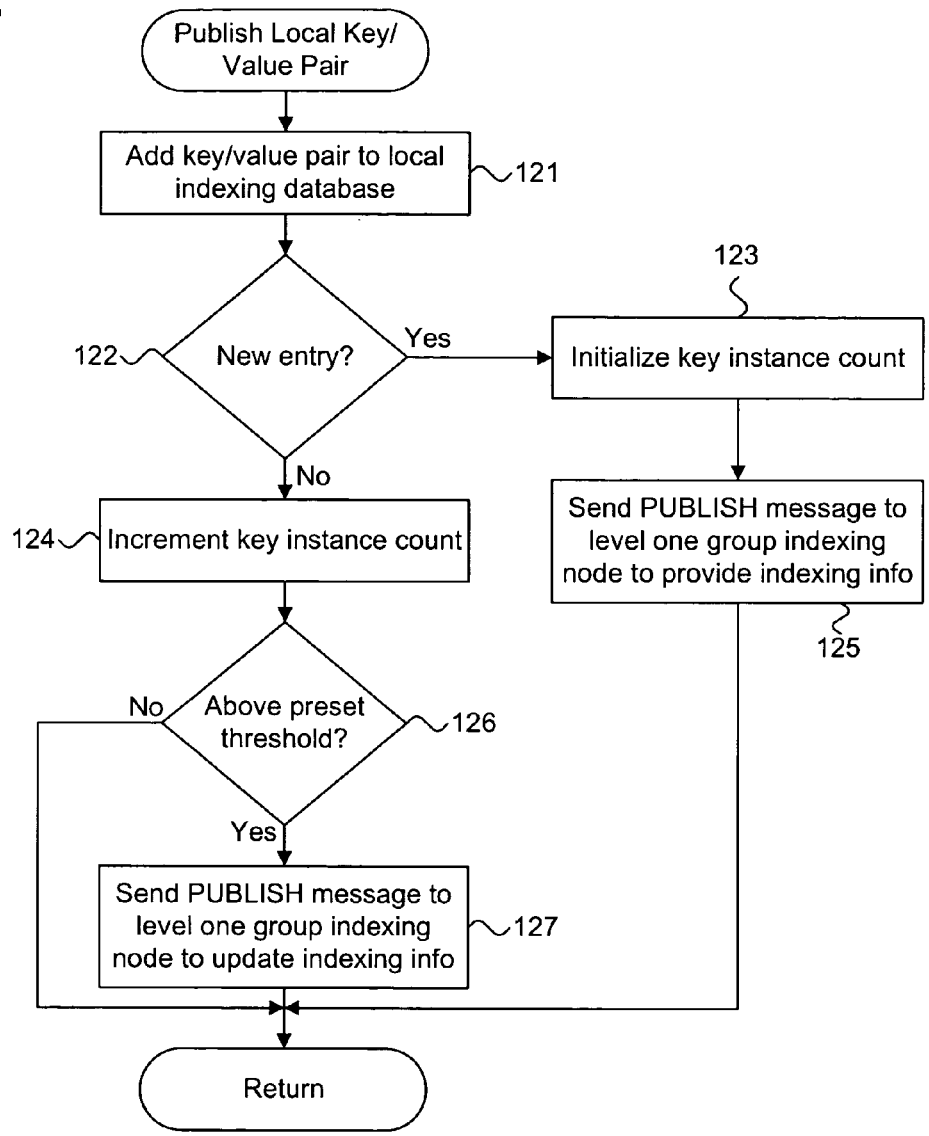
FIG. 11 is a flow diagram showing a routine for publishing a local key/value pair for use in the method of FIG. 10.

FIG. 11 is a flow diagram showing a routine 120 for publishing a local key/value pair for use in the method 100 of FIG. 10. The purpose of the routine is to publish indexing information from a storing peer node to an initial level group indexing peer node.

First, each new key and value pair is added as a local index entry 61 to the local indexing database (block 121). If a new local index entry 61 is created for the key (block 122), an instance count for the key is initialized (block 123) and a PUBLISH message is immediately sent to the initial level group indexing node with the key and the published identifier 31 of the storing peer node (block 125). If the key already exists in the local indexing database (block 122), the instance count for the key is incremented (block 124). If the instance count change is above a preset threshold (block 126), a PUBLISH message is sent to the initial level group indexing peer node to update the indexing information (block 127). If the instance count change is below the preset threshold (block 126), updating of the indexing information is deferred. The routine then returns.

The publishing process can logically continue at the initial level group indexing peer node as part of the PUBLISH message processing. The initial level group indexing peer node can send further PUBLISH messages to subsequent level group indexing peer nodes if the instance count change is above the preset threshold and the update process can continue until the maximum level is reached.

Unpublishing a Local Key/Value Pair

Figure 12:
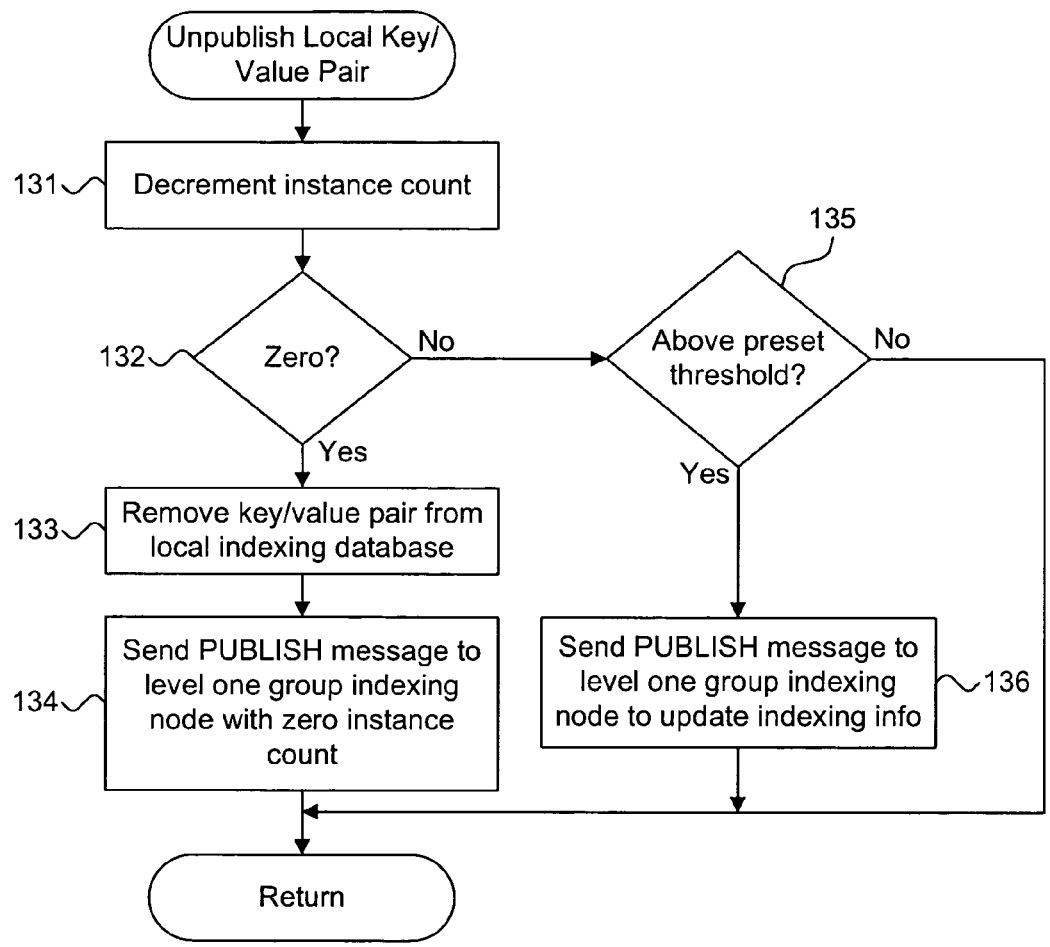
FIG. 12 is a flow diagram showing a routine for unpublishing a local key/value pair for use in the method of FIG. 10.

FIG. 12 is a flow diagram showing a routine 130 for unpublishing a local key/value pair for use in the method 100 of FIG. 10. The purpose of the routine is to unpublish, that is, remove, indexing information from an initial level group indexing peer node.

First, the instance count for the key is decremented (block 131). If the instance count drops to baseline, that is, zero (block 132), the key and value pair is removed as a local index entry 61 from the local indexing database (block 133) and a PUBLISH message is immediately sent to the level one group indexing node with an instance count 68 set to baseline, that is, zero (block 134), which signifies that the indexing information is to be unpublished. Similarly, if the instance count change is above a preset threshold (block 135), a PUBLISH message is immediately sent to the level one group indexing node with new index count (block 136). Baseline values other than zero are also possible. The routine then returns.

If the instance count change at the level one group indexing peer node is above a preset threshold, the publishing process can logically continue at the initial level group indexing peer node as part of the PUBLISH message processing. The initial level group indexing peer node can send further PUBLISH messages to subsequent level group indexing peer nodes if the instance count change is above the preset threshold and the update process can continue until the maximum level is reached.

Publishing to a Higher Level Group

Figure 13:
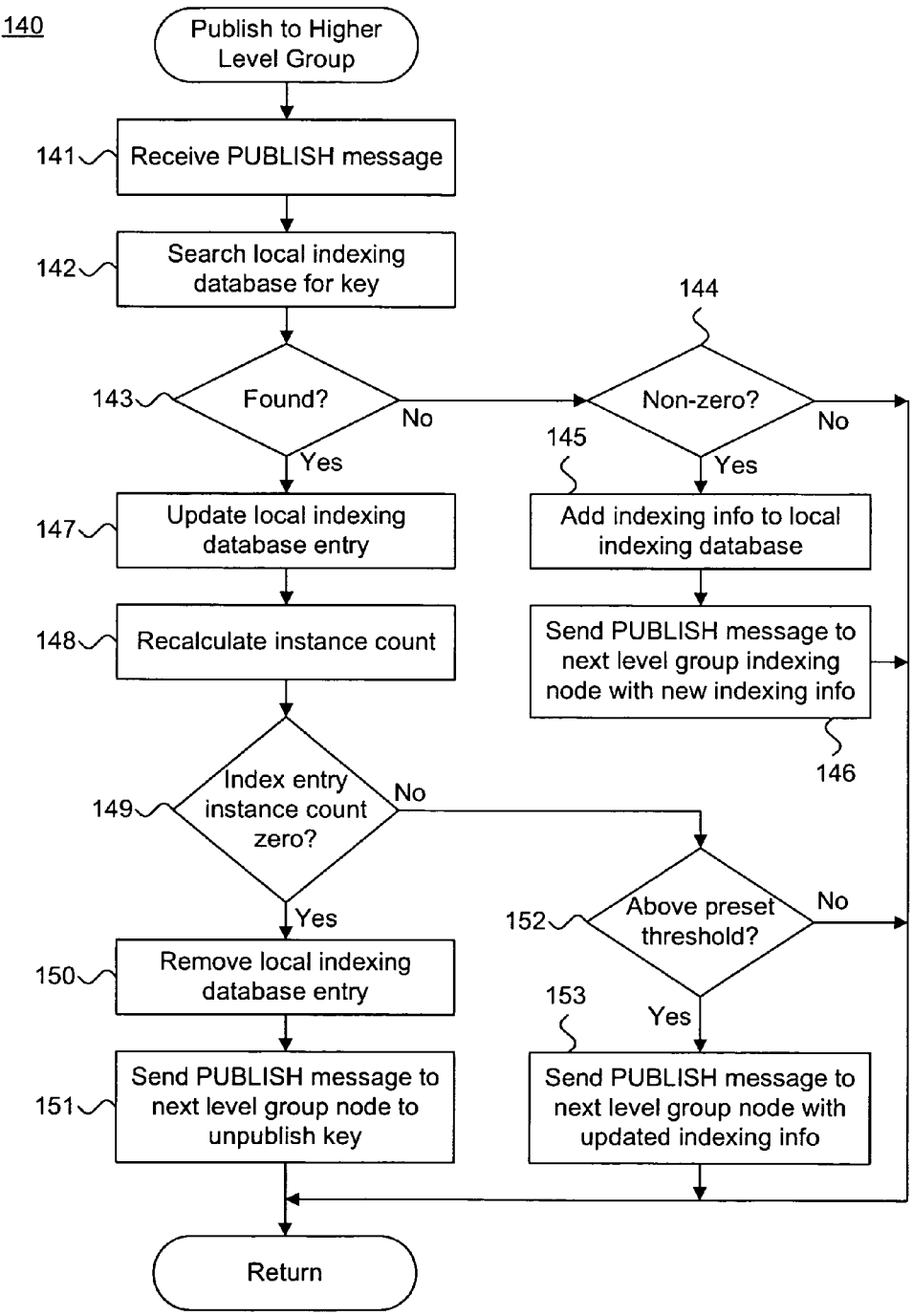
FIG. 13 is a flow diagram showing a routine for publishing to a higher level group for use in the method of FIG. 10.

FIG. 13 is a flow diagram showing a routine 140 for publishing to a higher level group for use in the method 100 of FIG. 10. The purpose of the routine is to propagate indexing information to a subsequent level in the peer node tree 51.

First, upon the receipt of a PUBLISH message (block 141), the peer indexing database is searched for an entry matching the key included with the publishing request (block 142). If the key is not found in the peer indexing table (block 143) and the instance count of the PUBLISH message changes from baseline, that is, is non-zero (block 144), the indexing information is added to the peer indexing database as a peer index entry 65 (block 145) and a PUBLISH message containing the indexing information is sent to the next level group indexing peer node (block 146). If the key is not found in the peer indexing table (block 143) and the instance count of the PUBLISH message is baseline, that is, zero (block 144), no further processing is necessary, except sending back a RESPONSE message.

Otherwise, if the key is already in the peer indexing table (block 143), the peer index entry 65 is updated (block 147) and the instance count for the key is recalculated (block 148). If the instance count of the peer index entry is baseline, that is, zero (block 149), the peer index entry 65 is removed from the local indexing database (block 150) and a new PUBLISH message with the instance count set to zero is sent to the next level group indexing peer node (Block 151). Otherwise, if the instance count of the peer index entry is not baseline, that is, non-zero (block 149) and the difference between the new instance count for the key and the last published instance count to upper level is above a preset threshold (block 152), a new PUBLISH message with updated indexing information is sent to the next level group indexing peer node (block 153) to cause a lazy update. Baseline values other than zero are also possible. Otherwise, no further processing is required and the routine returns.

Processing a Query

Figure 14:
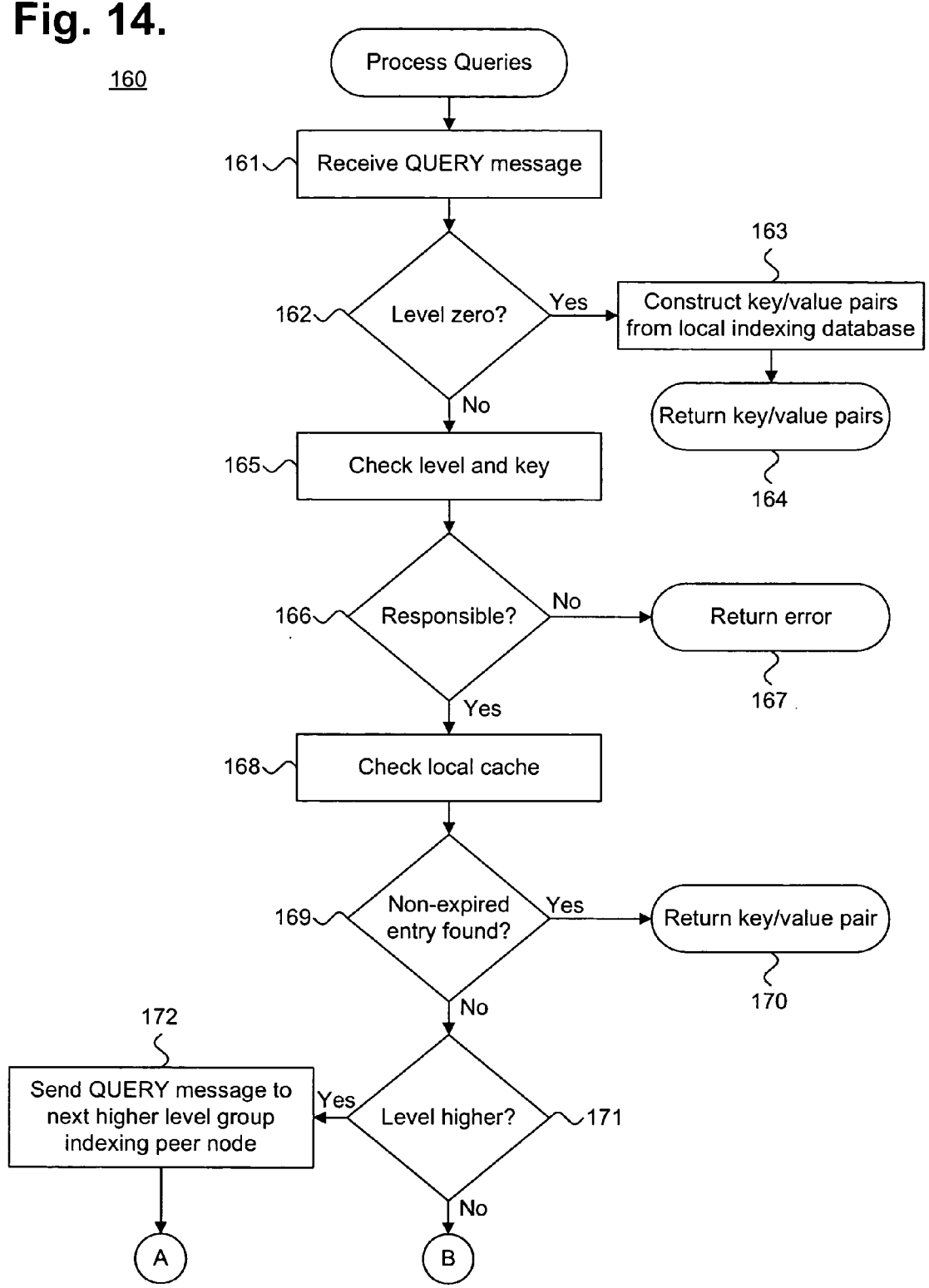
FIG. 14 is a flow diagram showing a function for processing a query for use in the method of FIG. 10.
Figure 14:
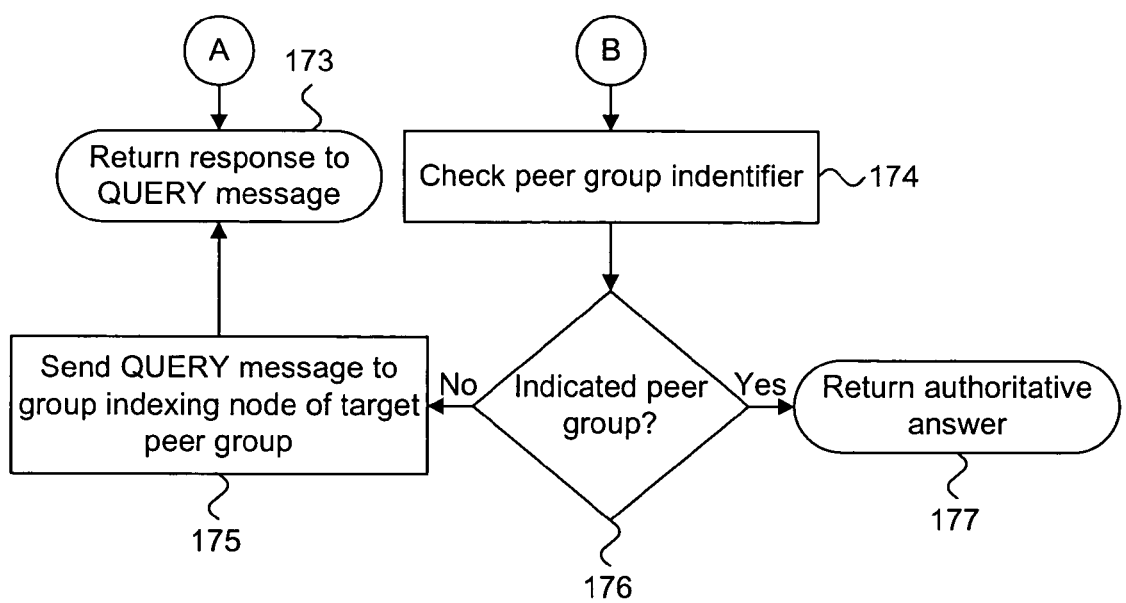

FIG. 14 is a flow diagram showing a function 160 for processing a query for use in the method 100 of FIG. 10. The purpose of the routine is to process a query request against a given key on behalf of a requesting peer node 23. If multiple keys are supplied, the query request is analyzed as a combination of multiple single-key queries. Typically, a query request is initiated by an application by calling an application programming interface defined on each peer node 23. In the described embodiment, each query request specifies the key to be searched and an expected number of responses.

Query requests sent to level zero are queries to be executed against the local indexing database, whereas query requests sent to a higher level are requests to expand the peer node tree 51 of the sending peer node. Thus, upon the receipt of a QUERY message (block 161), if the level of the query equals baseline, that is, zero (block 162), the local indexing database is consulted to construct a set of key and value pairs (block 163), which are returned in a RESPONSE message (block 164). Otherwise, if the level of the query is larger than baseline, that is, zero (block 162), the level of the query and the key are checked to make ensure the local peer node is the appropriate peer node to answer the query request (block 163).

If the local peer node is not responsible for answering the query request (block 166), a RESPONSE message containing an error code is returned (block 167). Otherwise, if the local peer node should process the query request (block 166), the local cache 93 is consulted (block 168). If a matching and non-expired cache entry is found (block 169), the cache entry is returned in a RESPONSE message (block 170). Otherwise, if either no matching cache entry is found or an expired cache entry is found (block 169), the query request must be forwarded to another group identifier peer node in the peer node tree 51.

If the level of the target peer node is higher than the level of the query (block 171), the receiving peer node forwards the query request to the next higher level group indexing peer node for the key 66 (block 172) and returns the response from the subsequent level group identifier peer node in a RESPONSE message (block 173). Otherwise, if the level of the query equals the level of the target peer node (block 171), the peer group identifier 69 in the QUERY message is checked (block 174). If the local peer node is not in the peer group indicated by the peer group identifier 69 (block 176), the receiving peer node forwards the query request to a group identifier peer node (block 175) identified according to equation (7) and returns the response from the group identifier peer node in a RESPONSE message (block 173). Otherwise, the receiving peer node returns an authoritative answer in a RESPONSE message (block 177), which includes a list of the published identifiers 31 for the peer nodes 23 if the level of the query is at level one, or a list of the lower level group identifiers that contains matching peer nodes 23 if the query is above level one. Baseline values other than zero are also possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing a peer indexing service, comprising:

a peer graph formed by assigning published identifiers to each of one or more peer nodes that each map to network addresses and defining a signed number space over the peer graph based on the published identifiers;

a peer name service to determine a closest peer node given a key by maintaining data identifying other peer nodes in the peer graph; and a storing peer node in the peer graph to maintain index information identifying the key and an associated value stored as a pair, comprising:

a local indexing database maintaining further key and value pairs;

a peer indexing database comprising a plurality of hierarchically structured levels as a factor of the number space size, comprising:

a level group identifier at a level of the peer indexing database and determined as a function of the published identifier of the storing peer node, the level and the number space size factor;

a hash function to hash the key as a function of the initial level group identifier and the number space size factor to identify a closest peer node sharing the initial level group identifier; and a peer index cache transiently maintaining key and value pairs.

2. A system according to claim 1, further comprising:
a count of each instance of the index information at the storing peer node, wherein the index information is published to an initial group indexing peer node by evaluating the instance count change relative to a threshold or a baseline.

3. A system according to claim 2, wherein the index information is unpublished from the initial group indexing peer node by evaluating the instance count change relative to a further threshold or the baseline.

4. A system according to claim 2, further comprising:
a storage module to store one or more of the further key and value pairs on the initial group indexing peer node.

5. A system according to claim 1, further comprising:
a subsequent level group identifier determined as a function of the published identifier of the storing peer node, a factor of the number space size and a level number subsequent to the initial level; and
an identifier to identify a subsequent group indexing peer node sharing the subsequent level group identifier, wherein the index information is published to the subsequent group indexing peer node.

6. A system according to claim 5, further comprising:
a count of each instance of the index information, wherein the index information is published to the subsequent group indexing peer node by evaluating the instance count change relative to a threshold or a baseline.

7. A system according to claim 6, wherein the index information is unpublished from the subsequent group indexing peer node by evaluating the instance count relative to a further threshold or the baseline.

8. A system according to claim 5, wherein the group identifier $G_J(P)$ for each peer node P at one such level number J is determined in accordance with the equation:

$$G_J(P) = \left\lfloor \frac{P}{2^{J \times T}} \right\rfloor$$

for J=0, 1 ..., S/T, where S is the number space size and T is the number space size factor.

9. A system according to claim 8, wherein each peer node P belongs to a group $R_J(P)$ at one such level number J determined in accordance with the equation:

$$R_J(P) = \left[ \left\lfloor \frac{P}{2^{J \times T}} \right\rfloor \times 2^{J \times T}, \left( \left\lfloor \frac{P}{2^{J \times T}} \right\rfloor + 1 \right) \times 2^{J \times T} \right)$$

for J=0, 1, ..., S/T, where S is the number space size and T is the number space size factor.

10. A system according to claim 9, wherein the hashing function $H_J(P,K)$ for a given key K stored at a peer node P at one such level number J is determined in accordance with the equation:

$$H_J(P, K) = (\text{Hash}(K) \% 2^{J \times T}) + \left\lfloor \frac{P}{2^{J \times T}} \right\rfloor \times 2^{J \times T}$$

for J=0, 1, ..., S/T, where S is the number space size and T is the number space size factor.

11. A system according to claim 10, wherein the level group indexing peer node $P_J$ is determined in accordance with the equation:

$$P_J = C_J(H_J(P,K)) = C_J(H_J(G_J,K)).$$

12. A system according to claim 1, further comprising:
a storing peer node to process a query received for a key and value pair, wherein the stored key and value pair is provided.

13. A system according to claim 1, further comprising:
one of a group indexing peer node and a subsequent group indexing peer node to process a query received from a receiving group indexing peer node for a key and value pair, wherein the query is forwarded to one other such subsequent group indexing peer node at a subsequent level if the level of the query is higher than the level of the receiving group indexing peer node.

14. A system according to claim 13, further comprising:
a query processor to process a query for a key and value pair received at one such group indexing peer node comprising providing an authoritative answer if the level of receiving group indexing peer node matches the level of the query and the receiving group indexing peer node is in the same level group as a group identifier in the query.

15. A system according to claim 13, further comprising:
a query processor to process a query for a key and value pair received at one such group indexing peer node comprising forwarding the query to a level group indexing peer node identified by a group identifier provided in the query if the group identifier of the receiving group indexing peer node does not match the group identifier provided in the query and the level of the query matches the level of the receiving group indexing peer node.

16. A system according to claim 1, further comprising:
a time-to-live value assigned to each key and value pair stored in the local index cache, wherein the key and value pair is discarded upon an expiration of the time-to-live value.

17. A system according to claim 1, wherein the level number is bounded by the number space size, further comprising:
a subsequent peer node at a bounded level number to process a query received for a key and value pair, wherein the query is forwarded to the storing peer node.

18. A system according to claim 1, wherein each network address comprises one of an IP version 4 network address and IP version 6 IP network address.

19. A system according to claim 1, wherein the data comprises an address certificate defining the mapping between the published identifier and the network address.

20. A system according to claim 1, wherein each publisher identifier comprises a hash of a crypto key assigned to the peer node and an instance identifier assigned to the peer graph.

21. A method for providing a peer indexing service, comprising:
forming a peer graph by assigning published identifiers to each of one or more peer nodes that each map to network addresses and defining a signed number space over the peer graph based on the published identifiers;
determining a closest peer node given a key by maintaining data identifying other peer nodes in the peer graph; and
maintaining index information identifying the key and an associated value stored as a pair on a storing peer node in the peer graph, comprising:
maintaining further key and value pairs in a local indexing database;

organizing a plurality of hierarchically structured levels in a peer indexing database as a factor of the number space size, comprising:
  storing a level group identifier at a level of the peer indexing database determined as a function of the published identifier of the storing peer node, the level and the number space size factor;
  hashing the key as a function of the initial level group identifier and the number space size factor to identify a closest peer node sharing the initial level group identifier; and
  transiently maintaining key and value pairs in a peer index cache.

22. A method according to claim 21, further comprising:
tracking a count of each instance of the index information at the storing peer node, wherein the index information is published to the an initial group indexing peer node by evaluating the instance count change relative to a threshold or a baseline.

23. A method according to claim 22, wherein the index information is unpublished from the initial group indexing peer node by evaluating the instance count change relative to a further threshold or the baseline.

24. A method according to claim 22, further comprising:
storing one or more of the further key and value pairs on the initial group indexing peer node.

25. A method according to claim 21, further comprising:
determining a subsequent level group identifier as a function of the published identifier of the storing peer node, a factor of the number space size and a level number subsequent to the initial level; and
identifying a subsequent group indexing peer node sharing the subsequent level group identifier; and
publishing the index information to the subsequent group indexing peer node.

26. A method according to claim 25, further comprising:
tracking a count of each instance of the index information, wherein the index information is published to the subsequent group indexing peer node by evaluating the instance count relative to a threshold or a baseline.

27. A method according to claim 26, wherein the index information is unpublished from the subsequent group indexing peer node by evaluating the instance count relative to a further threshold or the baseline.

28. A method according to claim 25, wherein the group identifier $G_J(P)$ for each peer node P at one such level number J is determined in accordance with the equation:

$$G_J(P) = \left\lfloor \frac{P}{2^{J \times T}} \right\rfloor$$

for J=0, 1, ..., S/T, where S is the number space size and T is the number space size factor.

29. A method according to claim 28, wherein each peer node P belongs to a group $R_J(P)$ at one such level number J determined in accordance with the equation:

$$R_J(P) = \left[ \left\lfloor \frac{P}{2^{J \times T}} \right\rfloor \times 2^{J \times T}, \left( \left\lfloor \frac{P}{2^{J \times T}} \right\rfloor + 1 \right) \times 2^{J \times T} \right)$$

for J=0, 1, ..., S/T, where S is the number space size and T is the number space size factor.

30. A method according to claim 29, wherein the hashing function $H_J(P,K)$ for a given key K stored at a peer node P at one such level number J is determined in accordance with the equation:

$$H_J(P, K) = (\text{Hash}(K) \% 2^{J \times T}) + \left\lfloor \frac{P}{2^{J \times T}} \right\rfloor \times 2^{J \times T}$$

for J=0, 1, ..., S/T, where S is the number space size and T is the number space size factor.

31. A method according to claim 30, wherein the level group indexing peer node $P_J$ is determined in accordance with the equation:

$$P_J = C_J(H_J(P,K)) = C_J(H_J(G_J,K)).$$

32. A method according to claim 21, further comprising:
processing a query for a key and value pair received at a storing peer node comprising providing the stored key and value pair.

33. A method according to claim 21, further comprising:
processing a query for a key and value pair received at one of a group indexing peer node and a subsequent group indexing peer node from a receiving group indexing peer node comprising forwarding the query to one other such subsequent group indexing peer node at a subsequent level if the level of the query is higher than the level of the receiving group indexing peer node.

34. A method according to claim 33, further comprising:
processing a query for a key and value pair received at one such group indexing peer node comprising providing an authoritative answer if the level of receiving group indexing peer node matches the level of the query and the receiving group indexing peer node is in the same level group as a group identifier in the query.

35. A method according to claim 33, further comprising:
processing a query for a key and value pair received at one such group indexing peer node comprising forwarding the query to a level group indexing peer node identified by a group identifier provided in the query if the group identifier of the receiving group indexing peer node does not match the group identifier provided in the query and the level of the query matches the level of the receiving group indexing peer node.

36. A method according to claim 21, further comprising:
assigning a time-to-live value to each key and value pair stored in the local index cache; and
discarding the key and value pair upon an expiration of the time-to-live value.

37. A method according to claim 21, wherein the level number is bounded by the number space size, further comprising:
processing a query for a key and value pair received at a subsequent peer node at a bounded level number comprising forwarding the query to the storing peer node.

38. A method according to claim 21, wherein each network address comprises one of an IP version 4 network address and IP version 6 IP network address.

39. A method according to claim 21, wherein the data comprises an address certificate defining the mapping between the published identifier and the network address.

40. A method according to claim 21, wherein each publisher identifier comprises a hash of a crypto key assigned to the peer node and an instance identifier assigned to the peer graph.

41. A computer-readable storage medium holding code for performing the method according to claim 21.

42. An apparatus for providing a peer indexing service, comprising:

means for forming a peer graph by means for assigning published identifiers to each of one or more peer nodes that each map to network addresses and means for defining a signed number space over the peer graph based on the published identifiers;

means for determining a closest peer node given a key by means for maintaining data identifying other peer nodes in the peer graph; and means for maintaining index information identifying the key and an associated value stored as a pair on a storing peer node in the peer graph, comprising:

means for maintaining further key and value pairs in a local indexing database;

means for organizing a plurality of hierarchically structured levels in a peer indexing database as a factor of the number space size, comprising:

means for storing a level group identifier at a level of the peer indexing database determined as a function of the published identifier of the storing peer node, the level and the number space size factor;

means for hashing the key as a function of the initial level group identifier and the number space size factor to identify a closest peer node sharing the initial level group identifier; and means for transiently maintaining key and value pairs in a peer index cache.

* * * * *